(12) United States Patent
Schlecht

(10) Patent No.: US 6,786,374 B2
(45) Date of Patent: Sep. 7, 2004

(54) DEVICE FOR THE FIXATION OF DIMENSIONALLY STABLE SUITCASES

(75) Inventor: Werner P. Schlecht, Vaihingen/Enz-Aurich (DE)

(73) Assignee: BOS GmbH & Co. KG, Aichwald (DE)

( * ) Notice: Subject to any disclaimer, the term of this patent is extended or adjusted under 35 U.S.C. 154(b) by 93 days.

(21) Appl. No.: 09/923,635

(22) Filed: Aug. 7, 2001

(65) Prior Publication Data

US 2002/0047032 A1 Apr. 25, 2002

(30) Foreign Application Priority Data

Aug. 9, 2000 (DE) .......................................... 100 38 752

(51) Int. Cl.[7] .............................................. B60R 11/00
(52) U.S. Cl. ........................ 224/544; 224/569; 224/571; 296/37.14; 296/37.16; 70/58; 70/69
(58) Field of Search ................................ 224/544, 539, 224/511, 517, 534, 536, 537, 547, 548, 555–558, 560, 567, 568, 570, 571, 311, 315, 323, 324, 545, 569; 248/500, 503; 296/37.14, 37.16; 70/58, 63, 69; 109/52

(56) References Cited

U.S. PATENT DOCUMENTS

| | | | | | |
|---|---|---|---|---|---|
| 963,883 | A | * | 7/1910 | Farley ......................... | 109/51 |
| 1,321,742 | A | * | 11/1919 | Hendricks .................... | 248/505 |
| 3,741,132 | A | * | 6/1973 | Blower ......................... | 109/52 |
| 4,249,684 | A | * | 2/1981 | Miller et al. ................. | 224/319 |
| 4,260,084 | A | * | 4/1981 | Warren, Jr. .................. | 224/430 |
| 4,274,568 | A | * | 6/1981 | Bott ............................. | 224/319 |
| 4,325,531 | A | | 4/1982 | Omholt ........................ | 248/553 |
| 4,493,268 | A | * | 1/1985 | Sidler ........................... | 109/52 |
| 4,577,563 | A | * | 3/1986 | Sidler ........................... | 109/52 |
| 5,395,019 | A | * | 3/1995 | Christensen ................. | 224/319 |
| 5,588,631 | A | * | 12/1996 | Yee .............................. | 224/547 |
| 5,653,366 | A | * | 8/1997 | Liserre ........................ | 224/539 |
| 5,788,135 | A | * | 8/1998 | Janek .......................... | 224/527 |
| 5,855,310 | A | * | 1/1999 | Van Ert et al. ............. | 224/539 |
| 5,979,725 | A | * | 11/1999 | Lehrman ..................... | 224/539 |
| 6,254,160 | B1 | * | 7/2001 | Marriott et al. ............. | 296/24.1 |
| 6,422,567 | B1 | * | 7/2002 | Mastrangelo et al. ....... | 224/404 |
| 6,572,169 | B2 | * | 6/2003 | Panhelleux et al. ......... | 296/37.8 |
| 2001/0054632 | A1 | * | 12/2001 | Larsen et al. ............... | 224/544 |

FOREIGN PATENT DOCUMENTS

| | | | | |
|---|---|---|---|---|
| DE | 41 32 954 A1 | | 4/1993 | |
| DE | 94 02 459.6 A1 | | 5/1994 | |
| DE | 295 15 128 U1 | | 2/1996 | |
| DE | 29611382 | * | 12/1997 | |
| EP | 0 128 810 A1 | | 12/1984 | |
| FR | 2 592 285 A1 | | 7/1987 | |
| FR | 2762815 | * | 11/1998 | |
| FR | 2 762 815 A1 | | 11/1998 | |
| FR | 2 781 731 A1 | | 2/2000 | |
| FR | 2781731 | * | 2/2000 | |
| GB | 2193475 | * | 10/1988 | ................. 224/558 |
| JP | 2000-289521 | * | 10/2000 | |

* cited by examiner

*Primary Examiner*—Nathan J. Newhouse
(74) *Attorney, Agent, or Firm*—Greenberg Traurig

(57) ABSTRACT

A device for the fixation of dimensionally stable suitcases, for example, for the cargo space of a motor vehicle. Receiving tracks are provided in a cargo space floor, which tracts are associated with securing means for the suitcases, corresponding securing elements are provided on the suitcases, which can be engaged with positive lock with securing means in the cargo space, and actuation means are provided, in the cargo space or on the suitcase, for the manual separation of the securing means and the securing elements from each other, for use, for example, in station wagons.

4 Claims, 2 Drawing Sheets

DEVICE FOR THE FIXATION OF DIMENSIONALLY STABLE SUITCASES

BACKGROUND OF THE INVENTION

1. Technical Field of the Invention

The invention relates to a device for the fixation of dimensionally stable suitcases in a cargo space of a motor vehicle.

2. The Prior Art

It is generally known to provide attachment eyelets in the cargo space of a station wagon in the area of the floor of the cargo space, which can be use for anchoring the tension straps or elastic holding straps, by means of which such luggage articles can be tied down to the floor of the cargo space.

The problem of the invention is to provide a device of the type mentioned above, which allows an improved securing of suitcases.

SUMMARY OF THE INVENTION

This problem is solved by providing receiving tracks in the floor of the cargo space, which are associated with securing means for the suitcases, in that corresponding, positive locking, securing means are provided on the suitcases, which can be engaged with securing means of the cargo space, and in that actuation means are provided for manually separating the securing means and the securing elements from each other, the latter being provided in the cargo space or on the suitcases. The result of this arrangement is a particularly secure anchoring of the suitcases to the floor of the cargo space, where the suitcases themselves can also advantageously be adapted to the securing means in the receiving tracks. Additional securing means such as tension straps, restraining straps, elastic straps or similar devices are thus no longer unnecessary. The effort required for the fixation and the separation is here considerably reduced by the already integrated securing elements and securing means in comparison to known fixation devices. If the actuation means are provided on the suitcases, the suitcases can be accommodated in any cargo space of a motor vehicle, which is provided with the corresponding receiving tracks and securing means. If the actuation means are provided in the cargo space, the suitcases themselves can be designed more simply and thus more cost advantageously than is the case when the actuation means are provided on the suitcase. Dimensional stability of the suitcases can here be understood to refer to a structure consisting of two dimensionally stable shells or to a suitcase design where only the frame portion and/or bottom portion is dimensionally stable, which, in particular, provides for the possibility of designing flexible lateral surfaces.

In an embodiment of the invention, the positive locking connection between the securing means, the securing elements and the receiving tracks is designed so it is at the level of application of vehicle crash stresses. The result is a crash safe connection of the suitcase to the floor of the cargo space, that is the suitcases remain in their anchored position in the cargo space even when they are exposed to vehicle crash stresses.

In an additional embodiment of the invention, the securing elements are positioned on the bottom side of each suitcase. The advantageous result is that the suitcases can be stored in an upright transport position.

In an additional embodiment of the invention, the receiving tracks are lowered into the floor of the cargo space and anchored rigidly as a result of the construction itself. Consequently, a particularly stable securing for the suitcases is achieved, which guarantees a crash safe attachment. The lowered arrangement of the receiving tracks guarantees that the bottom side of the receiving tracks is in a position flush with the surface of the floor of the cargo space, resulting in an overall flat cargo space surface.

In an additional embodiment of the invention, the actuation means have a rotating element which can be operated manually, which moves, via a transfer mechanism, the securing elements or the securing means into the open or stopped position. This design is particularly advantageous from an ergonomic point of view. The transfer mechanism transfers the rotating movement of the rotating element to the corresponding movement of the securing elements or securing means in the open or stopped position.

Additional advantages and characteristics of the invention can be obtained from the claims as well as the subsequent description of the preferred embodiment variant of the invention, which is represented with reference to the drawings.

DETAILED DESCRIPTION OF THE DRAWINGS

Figure 1:
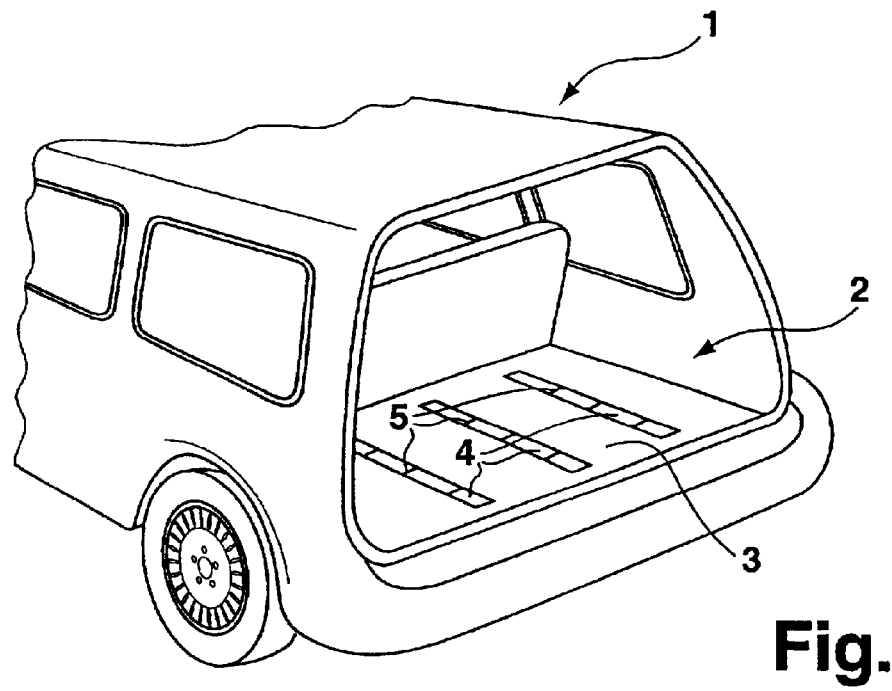
FIG. 1 shows a perspective view of the rear end of a station wagon with removed rear opening hood, where receiving tracks of the suitcase fixation according to the invention can be seen in the floor of a cargo space.

While this invention is susceptible to embodiment in many different forms, there are shown in the drawings and will be described in detail herein several specific embodiments, with the understanding that the present disclosure is to be considered as an exemplification of the principle of the invention and is not intended to limit the invention to embodiments illustrated.

Figure 3:
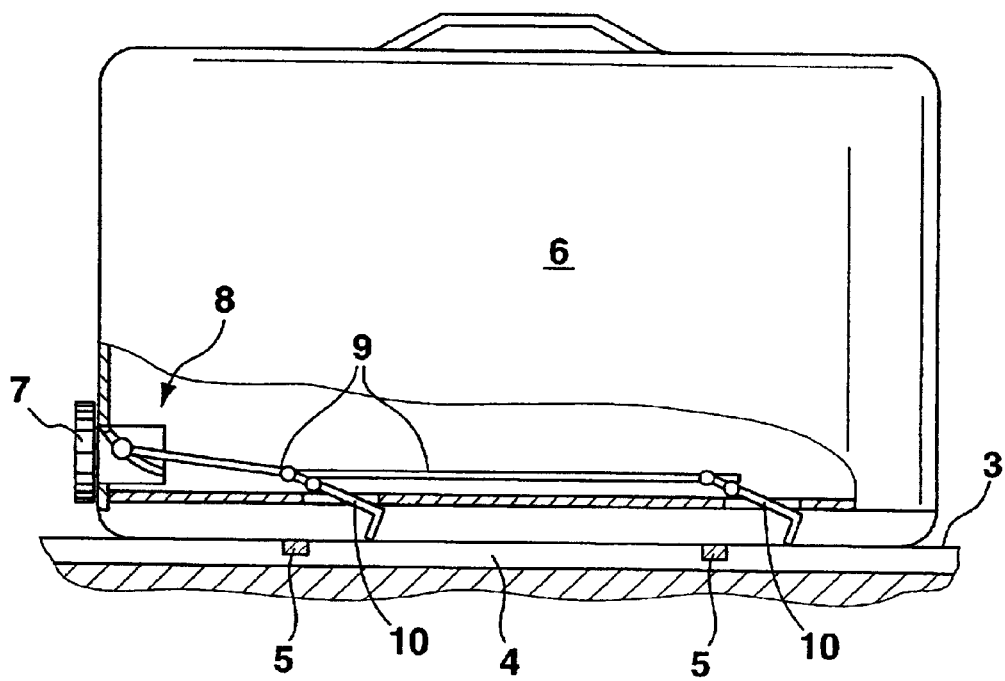
FIG. 3 is a lateral view, with partial cutout, of the positioning of a suitcase on the floor of the cargo space according to FIG. 2.
Figure 4:
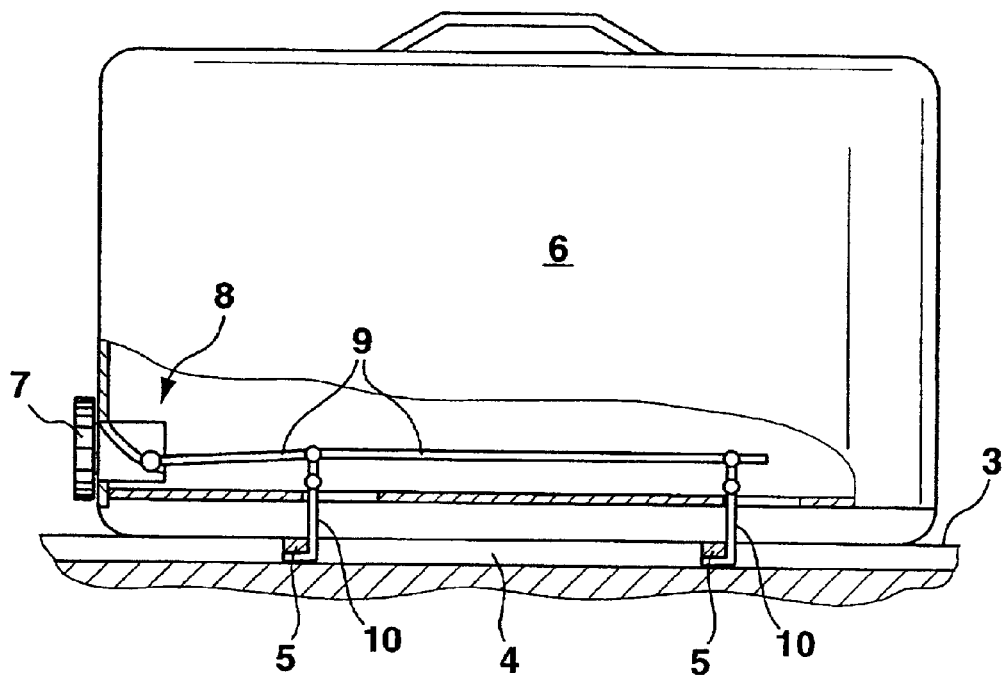
FIG. 4 is a representation according to FIG. 3, showing the suitcase, with partial cutout, in its stopped position.

A motor vehicle in the form of a station wagon 1 shows, according to FIG. 1, in the rear end portion, a cargo space 2, which is delimited in the front by the back of a rear seat bench. The cargo space 2 has a cargo space floor 3 which is essentially flat in its entirety. The cargo space floor 3 is provided with several, in the present embodiment example three, parallel receiving tracks 5, which are oriented in the longitudinal vehicle direction, and which are lowered into the cargo space floor 3 in such a manner that the top edges of the receiving tracks 4 are at the same level as the surface of the cargo space floor 3. The receiving tracks 4 are provided with securing means in the form of several cross ledges 5, which are arranged one after the other at intervals, and which are integrally connected with the receiving tracks 4. The receiving tracks 4 thus form, together with the securing means 5, in each case a ladder-shaped longitudinal profile, which, in cross section, is essentially in the shape of a U. The cross ledges 5 serve as the rungs of the ladder-shaped longitudinal profile. The cross ledges 5 form the anchoring points for associated stopping hooks 10, which are provided as corresponding securing elements on dimensionally stable suitcases 6, as can be seen in FIGS. 3 and 4.

Figure 2:
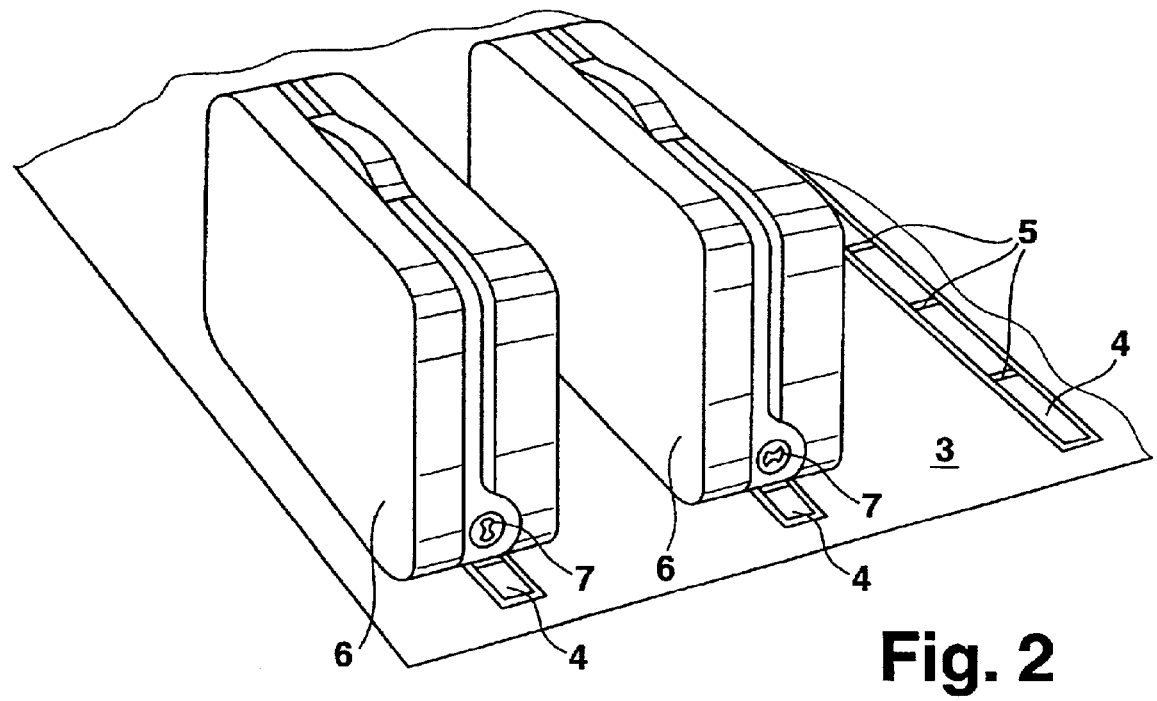
FIG. 2 is a perspective view of a cross section of the cargo space of FIG. 1 with two fixed suitcases.

The dimensionally stable suitcase 6 can be anchored in the upright position by means of the securing hooks 10, according to FIG. 2, in the cargo space 3. For this purpose, in the bottom area of each suitcase 6, two stopping hooks 10 are attached so they can rotate about a horizontal and diagonal rotation axis between a release position (FIG. 3) and a stop position (FIG. 4). To rotate the stopping hook 10, a transfer mechanism 8, 9 is provided, which consists of a lever rod 9 and a cam guide 8. By means of the cam guide 8, the rotating movement of manually operated rotating element 5 is transferred to a pushing and pulling movement of the lever rod 9, to which, in turn, the stopping hook 10 is attached by an articulation. By rotating the rotating element 7 which is arranged on the exterior to one of the front sides of a given suitcase 6, the stopping hooks 10 can thus be moved into the release or the stop position.

To be able to fix suitcases 6 in the cargo space 2, the suitcases 6 are first deposited in alignment with the corresponding receiving tracks 4 on the cargo space floor 3. Then the rotating elements 7, which are in the form of rotating knobs, are rotated in each case in such a manner that the stopping hooks 10 move into their stop position, in which the stopping hooks 10 grab the corresponding cross ledge 5 of the corresponding receiving track 4 from the back and below. Viewed in the normal driving direction, the stopping hooks 10 are thus arranged in each case behind the cross ledges, so that suitcases 6 are blocked with positive lock by the stopping hooks when the vehicle decelerates abruptly. Moreover, any movement of lifting these suitcases 6 in the stop position in the upward direction is also prevented because, in each case, the lower arm of the stopping hook 10 blocks, with positive lock, a corresponding lifting motion because the corresponding cross ledge 5 performs the motion of grabbing from below. The cam guide 8 is designed so it is self-locking, or it is provided with corresponding lock elements, to maintain the stop position until the corresponding rotating knob 7 is again turned back into the release position.

In the case of embodiment variants of the invention, which are not shown, the actuation means, which are responsible for the transfer of the corresponding opening and stopping movement to the securing elements or the securing means, are provided in the area of the receiving tracks, and thus in the floor of the cargo space. The bottom sides of the suitcases then need only be provided with simply designed securing elements in the form of stop heads, stop recesses, ledge sections or similar parts, where the corresponding moveable securing means, which can be moved from the release position to the stop position, are then provided in the area of the cargo space floor, that is in the area of the receiving tracks.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

What is claimed is:

1. A device for the fixation of dimensionally stable suitcases in a cargo space of a motor vehicle, wherein, in a cargo space floor (3), receiving tracks (4) are provided, which are associated with securing means (5) for the suitcases (6), wherein corresponding securing elements (10), which can be engaged with positive lock with the securing means (5) in the cargo space, are provided on the suitcases (6), and wherein actuation means (7, 8, 9) are provided for the manual separation of the securing means (5) and the securing elements (10) from each other, and arranged in the cargo space or on the suitcase, wherein the receiving tracks are integrally mounted within the cargo space floor, such that upper surfaces of the receiving tracks are of a level height with surrounding areas of the cargo space floor and are not elevated with respect to same, and further wherein the receiving tracks are elongated and extend continuously substantially the entire length of the cargo space, wherein the receiving tracks are arranged so that a plurality of suitcases (6) may be secured in the cargo space, each suitcase mounted along a single receiving track (4).

2. The device according to claim 1, wherein the securing elements (10) are positioned on the bottom side of each suitcase.

3. The device according to claim 1, wherein the actuation means present a manually operated rotating element (7), which, via a transfer mechanism (8), moves the securing elements (10) or the securing means to the open or the stopped position.

4. A device for the fixation of dimensionally stable suitcases in a cargo space of a motor vehicle, in combination with at least one suitcase (6), wherein, in a cargo space floor (3), receiving tracks (4) are provided, which are associated with securing means (5) for the suitcases (6), wherein corresponding securing elements (10), which can be engaged with positive lock with the securing means (5) in the cargo space, are provided on the suitcases (6), and wherein actuation means (7, 8, 9) are provided for the manual separation of the securing means (5) and the securing elements (10) from each other, and arranged in the cargo space or on the suitcase, wherein the receiving tracks are integrally mounted within the cargo space floor, such that upper surfaces of the receiving tracks are of a level height with surrounding areas of the cargo space floor and are not elevated with respect to same, and further wherein the receiving tracks are elongated and extend continuously substantially the entire length of the cargo space, wherein the receiving tracks are arranged so that a plurality of suitcases (6) may be secured in the cargo space, each suitcase mounted along a single receiving track (4); and wherein the at least one suitcase is provided with at least two in-line securing elements, for engagement longitudinally along a single receiving track, the at least two securing elements being actuated together by a single actuating mechanism.

* * * * *